United States Patent [19]
Moriwaki et al.

[11] Patent Number: 6,075,116
[45] Date of Patent: Jun. 13, 2000

[54] POLYAMIDE RESIN COMPOSITION

[75] Inventors: Takeshi Moriwaki; Toshiharu Sakaguchi, both of Osaka, Japan

[73] Assignee: Kishimoto Sangyo Co., Ltd., Osaka, Japan

[21] Appl. No.: 09/107,420

[22] Filed: Jun. 30, 1998

[30] Foreign Application Priority Data

Jun. 30, 1997 [JP] Japan ...................................... 9-190634
Jun. 30, 1997 [JP] Japan ...................................... 9-190635

[51] Int. Cl.$^7$ ........................... C08G 73/00; C08L 77/00; C08L 61/02
[52] U.S. Cl. ........................... 528/310; 528/170; 528/322; 528/392; 525/66; 525/183; 525/274; 525/324; 525/397; 525/420; 525/429; 525/432; 524/538; 524/541
[58] Field of Search ............................ 525/66, 183, 274, 525/324, 429, 397, 420, 432; 528/170, 310, 322, 392

[56] References Cited

U.S. PATENT DOCUMENTS

| | | | |
|---|---|---|---|
| 4,617,356 | 10/1986 | Hosaka et al. ........................... | 525/429 |
| 5,346,963 | 9/1994 | Hughes et al. ........................... | 525/285 |
| 5,492,980 | 2/1996 | Moriwaki ................................. | 525/429 |

FOREIGN PATENT DOCUMENTS

| | | |
|---|---|---|
| 0 258 040 | 3/1988 | European Pat. Off. . |
| 0 279 578 | 8/1988 | European Pat. Off. . |
| 0 592 941 | 4/1994 | European Pat. Off. . |
| 07053862 | 2/1995 | Japan . |
| WO 96/35742 | 11/1996 | WIPO . |
| WO 97/12919 | 4/1997 | WIPO . |

*Primary Examiner*—P. Hampton Hightower
*Attorney, Agent, or Firm*—Armstrong, Westerman, Hattori, McLeland & Naughton

[57] ABSTRACT

The present invention provides a highly impact resistant polyamide composition which comprises a polyamide resin and an acid modification product of a metallocene catalyzed polyolefin elastomer. The invention also provides a less hygroscopic and highly impact resistant polyamide composition which comprises a polyamide resin, novolak phenol and an acid modification product of a metallocene catalyzed polyolefin elastomer. Used as the polyamide resin is less expensive nylon 6.

18 Claims, 6 Drawing Sheets

MOLECULAR WEIGHT DISTRIBUTION
(GPC CHART)

DSC MELTING POINT
AND DENSITY

LONG SIDE CHAIN

POLYAMIDE RESIN COMPOSITION

BACKGROUND OF THE INVENTION

1. Field of the Invention

The present invention relates to improvement of polyamide resins. More particularly, the invention relates to a highly impact resistant polyamide composition containing an acid modification product of a polyolefin elastomer as a modifier and to a less hygroscopic and highly impact resistant polyamide composition containing a novolak phenol as well as an acid modification product of a polyolefin elastomer as modifiers.

2. Description of the Prior Art

Polyamide resins (PAs) are polymers having amide functionality in the monomeric unit thereof, and generally referred to as "nylons". Examples thereof include polyhexamethylene adipamide (nylon 66), polycaprolactam (nylon 6, PA 6), polyundecanamide (nylon 11) and polylaurylactam (nylon 12).

The polyamides are less expensive, and superior in moldability, mechanical properties, chemical properties (e.g., erosion resistance and corrosion resistance) and physical properties. The polyamides are widely used as materials for various mechanical components of automobiles and electric appliances.

Research and development have been made on compounding materials and modifiers which are used for improvement of properties of the polyamides to meet property requirements of final products with little or no impairment of the excellent properties intrinsic in the polyamides.

The polyamides have a drawback such that they generally have a low impact resistance in an absolutely dry state (e.g., immediately after the molding thereof), unlike in a moistened state.

A current technical challenge is to improve the impact resistance of the polyamides without sacrificing any of their excellent intrinsic properties. If the above mentioned material is developed, such an inconvenience that a product molded from a polyamide composition is fractured due to a low impact resistance thereof in a dry state can be eliminated. Further, a composition such as of a less expensive nylon 6 can be imparted with a high impact resistance so as to be used as a material for highly impact resistant products. Such a polyamide composition will be a promising alternative to more expensive impact resistant materials.

However, relatively heavy limitations are imposed on the choice of the modifier to be contained in the polyamide composition, because the excellent properties of the polyamide are attributable to amide functional group (functionality) thereof. Such limitations are associated with the melting point and glass transition point of the modifier, and the injection-moldability and other process requirements of the resulting composition, which depend on products to be molded from the composition.

Therefore, it is difficult to find the compounding material or the modifier for improving the impact resistance of the polyamide compositions without sacrificing the excellent properties of the polyamides.

For improvement of the impact resistance of a polyamide in the absolute dry state, polyolefin polymer, such as ethylene/propylene copolymer or ethylene/propylene/1,4-hexadiene copolymer (EPDM), grafted by maleic anhydride or the like are used as an impact modifier. In such a case, the resulting polyamide exhibits an improved impact resistance, but the flexural modulus thereof is remarkably reduced. Therefore, such a polyamide is not suitable for applications requiring a sufficient load resistance and impact resistance.

Among the exemplary polyamides, the nylon 6 (polycaprolactam, PA 6) is less expensive and excellent in chemical resistance and mechanical properties. However, the nylon 6 absorbs a large amount of water because of the presence of amide functional group in the molecule thereof, so that the nylon 6 is liable to be softened. Accordingly, the tensile strength, flexural strength and flexural modulus of the nylon 6 are remarkably reduced in a moistened state.

More specifically, it has been found that the tensile strength, flexural strength and flexural modulus of the nylon 6 in a moisture conditioned state (under equilibrium conditions at 23° C., 50% RH) are about 60% to 40% lower than in the absolutely dry state, though the Izod impact strength is two times higher. This is demonstrated in Comparative Example 2-1 of the present invention shown in Table 2-1. The reduction in the flexural modulus means that deformation of a molded product under load is aggravated due to moisture absorption thereof. Therefore, it is difficult to employ the nylon 6 as a material for structural components. For this reason, there is a demand in the industries for improvement of such defect of nylon 6.

A glass fiber reinforced polyamide composition of improved properties is disclosed in Japanese Unexamined Patent Publication No. 7-53862 (1995) which was filed by the inventors of the present invention. The polyamide composition comprises glass fibers and a polyamide matrix (PA/Novolac phenol composition, PA/PH composition) containing nylon 6 and a novolak prepolymer. In the case of the PA/PH composition, the reduction of the tensile strength and flexural strength due to water absorption is suppressed, but the Izod impact strength is reduced in comparison with the case of the nylon 6. Where the PA/PH composition contains the novolak prepolymer in a proportion of 30%, the Izod impact strength thereof in the absolute dry state is much lower than that of the nylon 6 (less than 50% of that of the nylon 6). This is demonstrated by Comparative Examples 2-1 to 2-4 of the present invention shown in Table 2-1. For this reason, the glass fibers are an indispensable component of the polyamide material for the composition.

SUMMARY OF THE INVENTION

It is a first object of the present invention to provide a polyamide resin which has a remarkably improved impact resistance in the absolutely dry state and can be used in a wide range of applications.

It is a second object of the present invention to provide a novel polyamide composition which is imparted with a hygroscopic resistance comparable to the PA/PH composition as well as an excellent impact resistance without blending glass fibers therewith.

In accordance with a first inventive mode, there is provided a highly impact resistant polyamide composition comprising a polyamide and a novel elastomer (M-POE)

obtained by acid-modifying, under specific conditions, a metallocene catalyzed polyolefin elastomer (a polyolefin elastomer (POE) resulting from olefin polymerization with the use of a metallocene catalyst).

More specifically, the polyamide composition comprises: 90 to 70 parts by weight of a polyamide; and correspondingly 10 to 30 parts by weight of an acid modification product of a metallocene catalyzed polyolefin elastomer.

The impact resistance of the polyamide composition in the absolute dry state is remarkably improved by blending a small amount of the polyolefin elastomer modified with an acid, such as a carboxylic acid, with the polyamide.

The polyamide, which has amide functional group in its backbone, is selected from the group consisting of an aliphatic crystalline linear polyamide such as obtained by condensation polymerization of a diamine and a dibasic acid, ring opening polymerization of a lactam or condensation polymerization of an aminocarboxylic acid, and a semi-aromatic crystalline polyamide obtained by polymerization of a diamine and a dibasic acid, either of which has an aromatic ring.

With this arrangement, the polyamide composition containing the aliphatic crystalline polyamide or the semi-aromatic crystalline polyamide has an improved impact resistance in the absolutely dry state.

The polyamide may be selected from the group consisting of nylon 6, nylon 66 and nylon 46.

With this arrangement, the polyamide such as nylon 6, nylon 66 or nylon 46 is imparted with a significantly improved impact resistance in the absolutely dry state with little or no adverse effect on the other excellent properties thereof.

The metallocene catalyzed polyolefin elastomer may be an ethylene/α-olefin copolymer with a comonomer ratio of α-olefin to ethylene being 5 wt % to 30 wt %.

With this arrangement, the impact resistance of the polyamide composition can remarkably be improved.

The metallocene catalyzed polyolefin elastomer has a repeating unit (based structure) of $[CH_2-CH_2]_n \cdot [CH_2-CH.R]_m$, wherein m is a positive integer, n is a positive integer, and R is a side chain of $CH_3 \cdot [CH_2]_L$ (wherein L is an integer not smaller than 3 and not greater than 8).

With this arrangement, the polyolefin elastomer has the repeating unit containing comonomers each having a proper length. Thus, the polyolefin elastomer has a moderate hardness and flexibility and, hence, the impact resistance of the polyamide composition can remarkably be improved.

The acid modification product of the metallocene catalyzed polyolefin elastomer is obtained by acid modification of the polyolefin elastomer with 0.01 wt % to 1.0 wt % of maleic acid or maleic anhydride.

With this arrangement, the acid modification of the metallocene catalyzed polyolefin elastomer is achieved by employing 0.01 wt % to 1.0 wt %, preferably 0.05 wt % to 0.2 wt % of maleic acid or maleic anhydride for addition of polar functional group to the polyolefin elastomer without crosslinking molecules of the elastomer. The polyamide composition containing the acid modification product of the polyolefin elastomer has a remarkably improved impact resistance.

In accordance with a second inventive mode, there is provided a less hygroscopic and highly impact resistant polyamide composition which comprises a polyamide (PA), a novolak phenol (PH), and a novel elastomer (M-POE) obtained by acid modification, under specific conditions, a polyolefin elastomer resulting from olefin polymerization with the use of a metallocene catalyst.

More specifically, the polyamide composition comprises: 100 parts by weight of a polyamide resin; 10 to 50 parts by weight of a novolak prepolymer; and 10 to 100 parts by weight of an acid modification product of a polyolefin elastomer obtained by olefin polymerization using a metallocene catalyst.

With this arrangement, 100 parts by weight of the polyamide resin, 10 to 50 parts by weight of the novolak prepolymer and 10 to 100 parts by weight of the acid modification product (graft polymer) of the polyolefin elastomer obtained by modifying with a carboxylic acid the metallocene catalyzed polyolefin elastomer are melt-kneaded to afford the polyamide composition. The resulting polyamide composition has a remarkably improved impact resistance as well as a low hygroscopicity.

The polyamide resin may be a crystalline aliphatic linear polyamide. The crystalline aliphatic polyamide has amide functional group in its backbone and is obtained by condensation polymerization of a diamine and a dibasic acid, ring opening polymerization of a lactam or condensation polymerization of an aminocarboxylic acid. The polyamide composition containing such an aliphatic crystalline polyamide as its main component has an excellent impact resistance and a low hygroscopicity.

The aliphatic crystalline polyamide resin may be nylon 6. The polyamide composition containing nylon 6 as its main component has a very high impact resistance and a low hygroscopicity.

The metallocene catalyzed polyolefin elastomer may be an ethylene/α-olefin copolymer with a comonomer ratio of α-olefin to ethylene being 5 wt % to 30 wt %.

The metallocene catalyzed polyolefin elastomer (ethylene/α-olefin copolymer) has a repeating unit of $[CH_2-CH_2]_n \cdot [CH_2-CH.R]_m$, wherein m is a positive integer, n is a positive integer, and R is a side chain of $CH_3 \cdot [CH_2]_L$ (wherein L is an integer not smaller than 3 and not greater than 8).

With this arrangement, the polyolefin elastomer has a proper processibility and flexibility because of the presence of the aforesaid repeating unit therein, and the acid modification product of such a polyolefin elastomer imparts the polyamide composition with an excellent impact resistance.

The acid modification product of the metallocene catalyzed polyolefin elastomer is obtained by acid-modifying the polyolefin elastomer with 0.01 wt % to 1.0 wt % of maleic acid or maleic anhydride.

Thus, the acid modification product of the metallocene catalyzed polyolefin elastomer imparts the polyamide composition with a remarkably improved impact resistance.

DETAILED DESCRIPTION OF THE INVENTION

Figure 1:
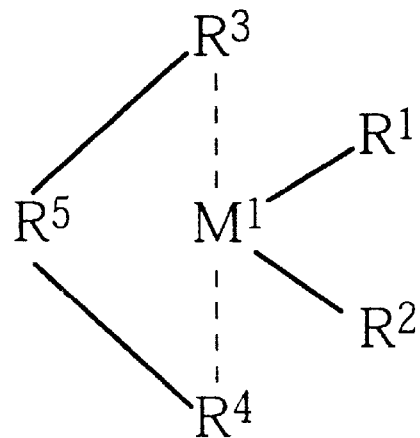
FIG. 1 shows one exemplary metallocene catalyst.

The present invention will hereinafter be described in detail.

Polyamide

Examples of specific aliphatic crystalline polyamides relating to the first and second inventive mode of the present invention include polyhexamethylene adipamide (nylon 66), polytetramethylene adipamide (nylon 46), polyhexamethylene sebacamide(nylon 610), polyhexamethylene dodecanamide (nylon 612), polycaprolactam (nylon 6), polyundecanamide (nylon 11) and polylaurylactam (nylon 12). Among these polyamides, nylon 610, nylon 612, nylon 11 and nylon 12 each having a long methylene chain are flexible and less hygroscopic materials, which are suitable for filaments and tubes though relatively expensive.

Examples of specific crystalline semi-aromatic polyamides relating to the first inventive mode include nylon MXD6 prepared from m-xylylenediamine (MXDA) and adipic acid, nylon 6T prepared from terephthalic acid and hexamethylenediamine, and the like.

In the first inventive mode, it is preferred in terms of costs to use nylon 6, nylon 66 or nylon 46 as the polyamide.

In the second inventive mode, it is preferred in terms of versatility and costs to use nylon 6 or nylon 66 as the polyamide.

The phenol prepolymer to be used in the second inventive mode is a phenol resin prepolymer of so-called novolak type which is obtained by condensing formaldehyde with an excess of phenol in the presence of an acidic catalyst.

Metallocene Catalyst

The metallocene catalyst generally has active sites having uniform properties, and is so called because it has a metallocene structure such that a transition metal is sandwiched between a pair of unsaturated cyclic compounds. The metallocene catalyst is also called "single-site catalyst". Since active sites having different properties are not present in the catalyst, it is possible to afford a homogeneous polymer having a narrow molecular weight distribution and a polymer having a certain regularity depending on symmetricalness of ligands.

One exemplary metallocene catalyst is shown in FIG. 1. This is a so-called metallocene complex. The metallocene complex shown in FIG. 1 may be used in combination with a compound (aluminoxane) as shown in FIG. 2 to form a composite catalyst.

In FIG. 1, $M^1$ represents titanium, zirconium, hafnium, vanadium, niobium or tantalum. $R^1$ and $R^2$ are the same or different, each representing a hydrogen atom, a halogen atom, an alkyl group having 1 to 10 carbon atoms, an alkoxyl group having 1 to 10 carbon atoms, an aryl group having 6 to 10 carbon atoms, an aryloxy group having 6 to 10 carbon atoms, an alkenyl group having 2 to 10 carbon atoms, an arylalkyl group having 7 to 40 carbon atoms, an alkylaryl group having 7 to 40 carbon atoms, or an arylalkenyl group having 8 to 40 carbon atoms. $R^3$ and $R^4$ are the same or different, each representing a residue of a single-ring or multi-ring hydrocarbon which can form a complex of sandwich structure in combination with the central metal atom $M^{7453\ 1}$. $R^5$ represents $=BR^6$, $=AlR^6$, —Ge—, —Sn—, —O—, —S—, $=SO$, $=SO_2$, $=NR^6$, $=CO$, $=PR^6$ or $P(O)R^6$ (wherein $R^6$ represents a hydrogen atom or a halogen atom). In FIG. 2, $R^{11}$, $R^{12}$, $R^{13}$, $R^{14}$ and $R^{15}$ are the same or different, each representing an alkyl group having 1 to 6 carbon atoms, a fluoroalkyl group having 1 to 6 carbon atoms, an aryl group having 6 to 18 carbon atoms, a fluoroaryl group having 6 to 18 carbon atoms or a hydrogen atom.

Figure 2:
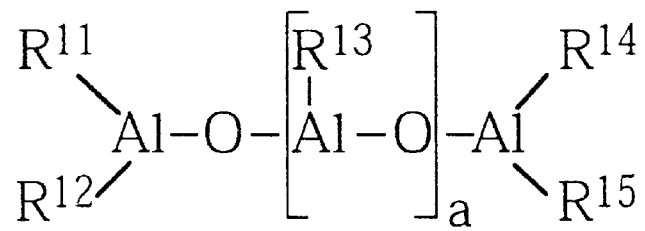
FIG. 2 shows one exemplary aluminoxane compound which is used in combination with a metallocene compound as a composite catalyst.
Figure 3:
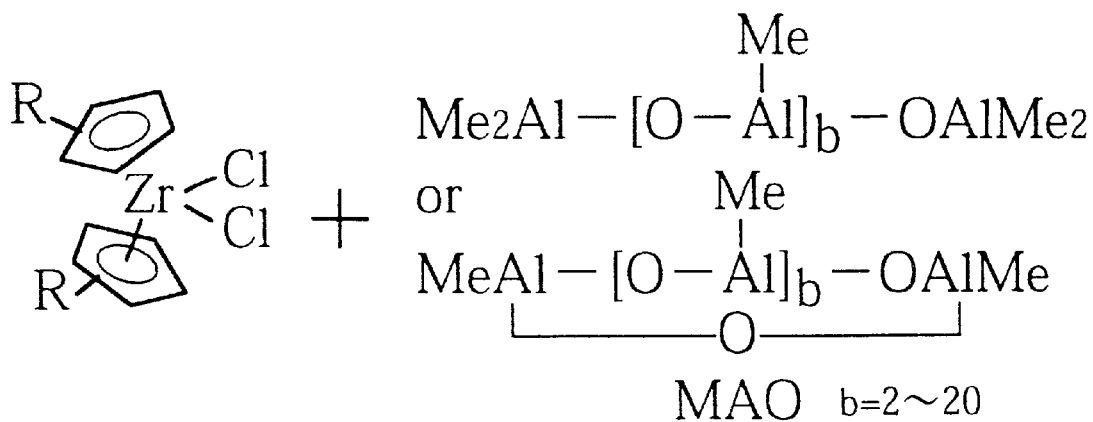
FIG. 3 shows a composite metallocene catalyst.

The composite catalyst including the compounds of FIGS. 1 and 2 is shown in FIG. 3.

The composite catalyst per se is well known, as disclosed in PACKPIA, No. 4, 1994, pp. 12–53, Japanese Unexamined Patent publications No. 5-140227 (1993), No. 5-140228 (1993) and No. 5-209019 (1993). Therefore, the composite catalyst will not herein be described in detail.

Figure 4:
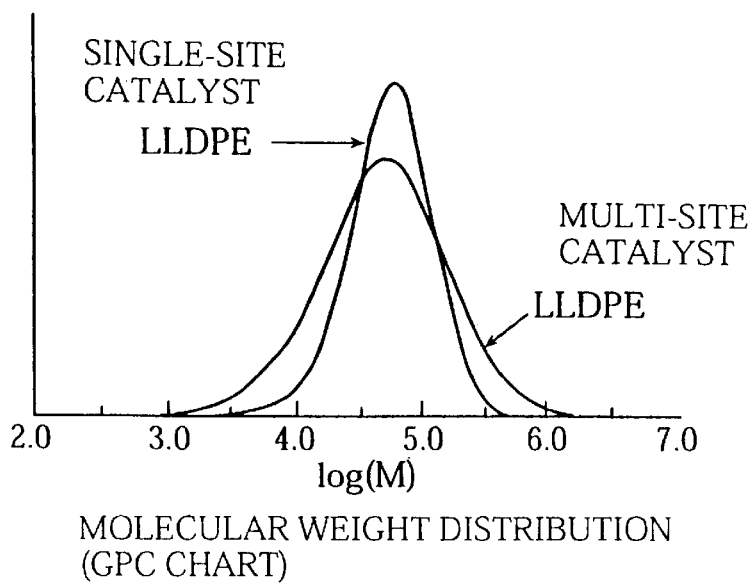
FIG. 4 is a graphical representation showing a difference in molecular weight distribution between a metallocene catalyzed (single-site catalyst) polyolefin elastomer and a conventional multi-site catalyzed polyolefin elastomer.
Figure 5:
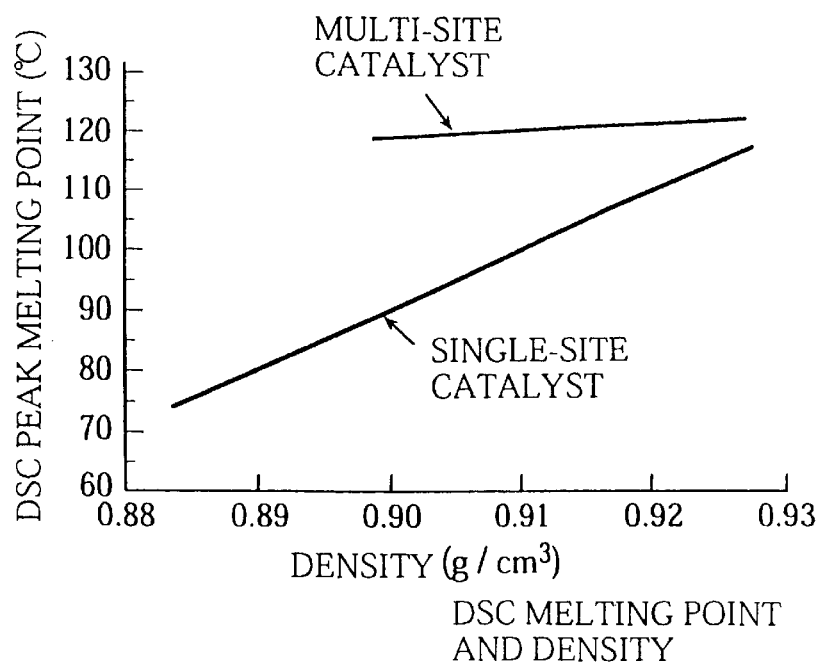
FIG. 5 is a graphical representation illustrating a difference in the relation of the DSC melting point versus the density between the polyolefin elastomers.

Polyolefin Elastomer Obtained by Olefin Polymerization Using Metallocene Catalyst The polyolefin elastomer obtained by olefin polymerization using the metallocene (single-site) catalyst has a narrow molecular weight distribution and a high homogeneity, unlike a polyolefin elastomer obtained by olefin polymerization using a conventional multi-site catalyst. Since the molecules of the polyolefin elastomer according to the present invention have uniform lengths, the polyolefin elastomer has a definite melting point and glass transition point and a homogeneous comonomer distribution, and is less tacky. The molecular weight distributions and the relations of the DSC melting points versus the densities of the polyolefin elastomers according to the present invention and the prior art are shown in FIGS. 4 and 5, respectively.

The polyolefin elastomer obtained by olefin polymerization using the metallocene catalyst is indispensable to the present invention. The polyolefin elastomer is an ethylene/α-olefin copolymer with a comonomer ratio of α-olefin to ethylene being 5 wt % to 30 wt %. Heretofore, an ethylene/α-olefin copolymer having 6-carbon side chains has been obtained by using a so-called "geometrically constrained metallocene catalyst" for the olefin polymerization. The geometrically constrained catalyst is a coordination metal complex in which a metal atom or ion is bonded to a delocalized substitution π bond site to form a constrained geometry around the metal atom or ion. One example of the geometrically constrained catalyst is a zirconocene dichloride compound (shown on the left in FIG. 3) which includes a pair of cyclopentadiene molecules as ligands and is used in combination with an aluminoxane compound (shown on the right in FIG. 3) as a composite catalyst.

Figure 6:
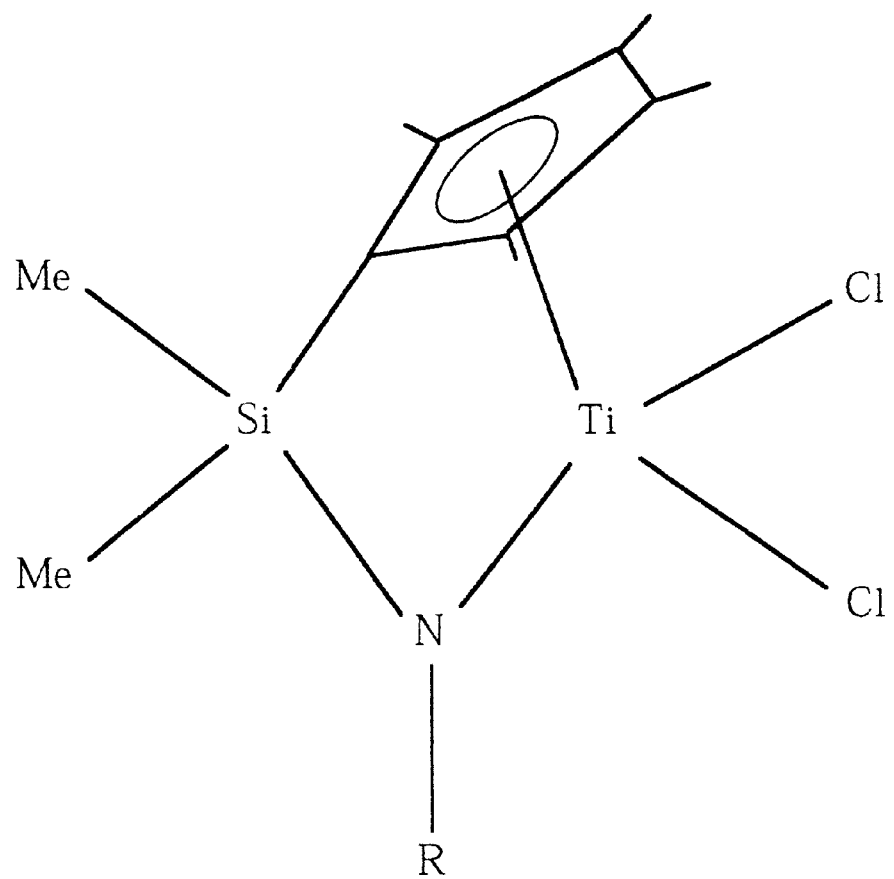
FIG. 6 shows the structure of an exemplary geometrically constrained catalyst.
Figure 7:
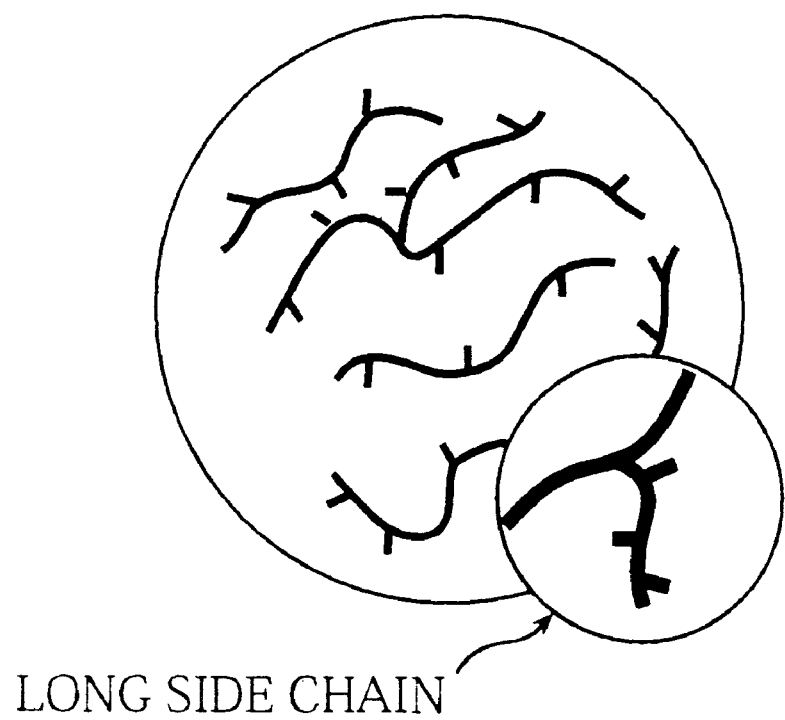
FIG. 7 is a schematic diagram illustrating the structure of a metallocene catalyzed polyolefin elastomer to be used in the present invention.
Figure 8:
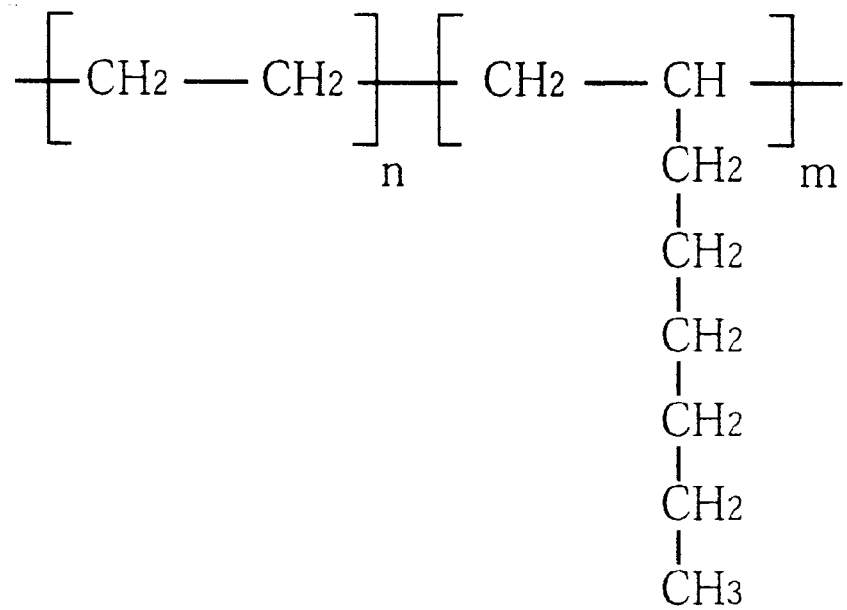
FIG. 8 shows a repeating unit of the metallocene catalyzed polyolefin elastomer.

Further, a metallocene compound having a structural formula as shown in FIG. 6 may be used as the metallocene catalyst. This metallocene catalyst is well known, as disclosed in Japan Plastics Vol. 47, No. 2, pp. 10, and Japanese Unexamined Patent Publications No. 7-500622 (1995) and No. 7-53618 (1995)and, therefore, will not be described in detail.

Where the geometrically constrained catalyst is used for the olefin polymerization, long side chains can selectively be introduced to the backbone of the polyolefin elastomer. Therefore, the resulting polyolefin elastomer is imparted with a good moldability as well as the aforesaid properties ensured by the use of the ordinary metallocene catalyst. The molecular structure of the polyolefin elastomer are schematically illustrated in FIG. 7. Further, the repeating unit of the polyolefin elastomer is shown in FIG. 8, which has a 6-carbon side chain. Such a polyolefin elastomer is available from Du Pont Dow Elastomer Co. under the trade name "ENGAGE" in Japan. Among 11 types of general-grade polyolefin elastomers of ENGAGE series (density: 0.885 to 0.0870 g/cc), ENGAGE 8200 has a density of 0.87 g/cc, a comonomer content of 24 wt %, a melt index of 5 (g/10 min), a tensile strength of 72 kg/cm$^2$, a 100%-tensile modulus of 22 kg/cm$^2$, an extension coefficient of 980%, a Shore hardness of 75 on A scale, a Shore hardness of 26 on D scale and a DSC melting point of about 68° C. at peak. Various types of higher-grade polyolefin elastomers (density: 0.910 to 0.895 g/cc) are also available from Du Pont Dow Elastomer Co. Polyolefin elastomers of these types are well known, as disclosed in a catalogue available from Du Pont Dow Elastomer Co. and Polyfile, Vol. 8, 1996, pp. 76 to 77 and, therefore, will not be described in detail.

Acid Modification of Polyolefin Elastomer

For improvement of the compatibility of a polyolefin such as polypropylene, polyethylene, ethylene-propylene rubber (EPR) or ethylene-propylene-dien rubber (EPDM) with a polyamide, it is a conventional practice to add polar functional group to the polyolefin by acid modification thereof. However, it has been believed that the polyolefin elastomer synthesized with the use of the metallocene catalyst cannot be acid-modified because the polyolefin elastomer is liable to be crosslinked by the action of a peroxide or radiation. The polyolefin elastomer can be used only in the unmodified basis as an additive (impact modifier) for various plastics because of its poor compatibility, but is used only with polyolefin plastics.

The inventors of the present invention has successfully achieved the acid modification of the polyolefin elastomer under specific conditions as described below, and obtained a polyamide composition having a high flexural modulus and an impact resistance superior to the prior-art polyamide composition by blending the acid modification product of the metallocene catalyzed polyolefin elastomer with the polyamide.

Usable as an acid for acid modification of the polyolefin elastomer are maleic acid, acrylic acid, methacrylic acid, fumaric acid, itaconic acid and citraconic acid, and anhydrides of these acids. Among these acids, maleic anhydride is preferred because of its bifunctionality and low cost. In addition, maleic anhydride has a high monomer reactivity due to steric hindrance and polarity thereof, so that grafting reaction can readily proceed. An organic peroxide having a moderate decomposition rate at a melting temperature of the elastomer is used as an initiator for the grafting reaction. More specifically, an organic peroxide having a half-value period of one minute at a decomposition temperature of 150° C. to 250° C. can be used as the initiator. Examples of specific organic peroxides include lauroyl peroxide, di-t-butyl peroxide, 1,3-bis(t-butylperoxyisopropyl)benzene, benzoyl peroxide, t-butyl perbenzoate and dicumyl peroxide.

Figure 9:
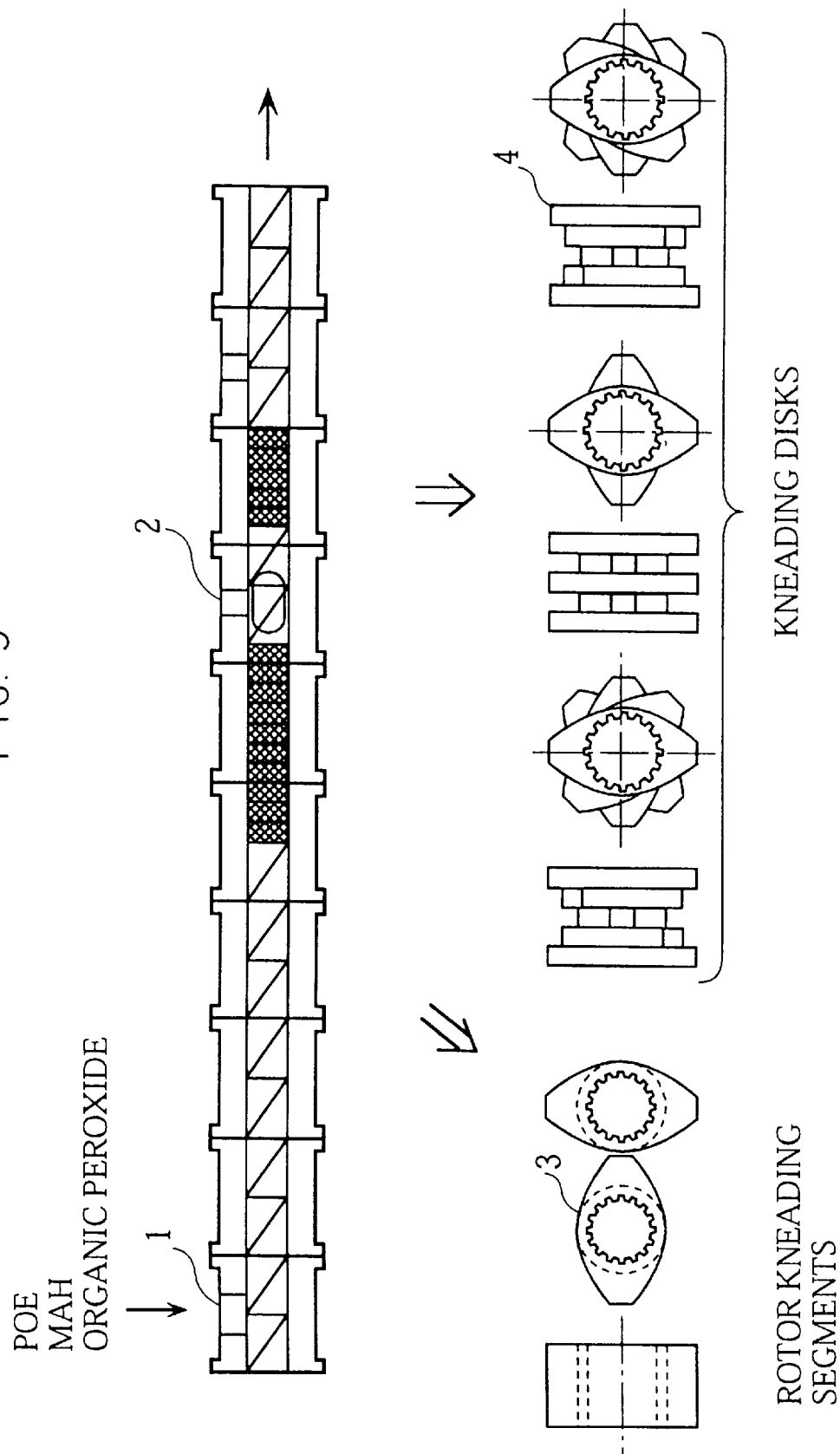
FIG. 9 is a schematic diagram illustrating a twin-screw extruder by which an acid modification process for acid-modifying the metallocene catalyzed polyolefin elastomer and a kneading process for blending the acid-modified metallocene catalyzed polyolefin elastomer with a polyamide resin are carried out.

The acid modification of the polyolefin elastomer is carried out by means of single screw extruder, twin-screw extruder or a kneader. It is preferred to use twin-screw extruder having a kneading mechanism such as rotor segments or kneading disks as shown in FIG. 9. In FIG. 9, reference numerals 1, 2, 3 and 4 denote a main (upper) feeding port, a downstream feeding port, rotor kneading segments and kneading disks, respectively. The downstream feeding port is not used in this acid modification process. After a cylinder of the extruder is heated up to a temperature at which the polyolefin elastomer can be melted and reacted with the organic peroxide, predetermined amounts of the polyolefin elastomer in pellet form, maleic anhydride and organic peroxide or a mixture thereof are continuously supplied into the extruder through a hopper of the main feeding port. The maleic anhydride is added in a proportion of 0.01 wt % to 1.0 wt %, preferably 0.05 wt % to 0.2 wt %, based on the weight of the polyolefin elastomer. If the proportion is too low, the resulting polyolefin elastomer has a poor compatibility with the polyamide. Even if the proportion is higher than the aforesaid range, the compatibility of the polyolefin elastomer can no longer be improved. If the proportion is too high, the molecules of the polyolefin elastomer may be crosslinked so that the resulting polyolefin elastomer cannot homogeneously be dispersed in and blended with the polyamide or the mixture of the polyamide and the novolak phenol. In addition, the fluidity of the resulting polyamide composition during molding thereof is lowered, so that the external appearance of a molded product may be impaired.

Preparation of Polyamide Composition by Melt-Kneading

The polyamide composition according to the first inventive mode can be prepared by melt-kneading a mixture of the polyamide and the acid modification product of the metallocene catalyzed polyolefin elastomer by means of an extruder.

The polyamide composition according to the second inventive mode can be prepared by melt-kneading a mixture of the polyamide, the novolak phenol and the acid modification product of the metallocene catalyzed polyolefin elastomer by means of an extruder.

An ordinary single screw extruder and twin-screw extruder can be used as the extruders in the first and second inventive modes.

For enhancement of a kneading ability, the single screw extruder may be provided with a Dulmage kneading screw or a barrier flight screw (such as Maddock type).

To streamline the preparation process for the polyamide compositions according to the first and second inventive modes, twin-screw extruder is preferably used, in which the acid modification reaction of the polyolefin elastomer is carried out on the upstream side thereof and the acid modification product of the polyolefin elastomer is melt-blended with the polyamide and the like supplied through the downstream feeding port. In this case, rotor kneading segments or a disk kneading block are preferably incorporated in the downstream side of the twin-screw extruder. It is noted that all the supplied maleic anhydride is used up for the acid modification of the elastomer and, therefore, does not adversely affect the long-term and short-term properties and workability of the polyamide composition.

First Inventive Mode

EXAMPLES 1-1 TO 1-4 AND COMPARATIVE EXAMPLES 1-1 TO 1-5

Examples 1-1 to 1-4 and Comparative Examples 1-1 to 1-5 of the first inventive mode will hereinafter be described. The following ingredients were used in Examples 1-1 to 1-4 and Comparative Examples 1-1 to 1-5.

Ingredients

1. Polyamides

Nylon 6 (PA 6): NYLON6 T310B available from Teijin Ltd.

Nylon 66 (PA 66): ZYTEL 101L available from E. I. Du Pont de Nemours & Co. Inc.

Nylon MXD6 (PA MXD6): RENY 6002 available from Mitsubishi Engineering Plastics Co., Ltd.

2. Metallocene catalyzed polyolefin elastomer Polyolefin elastomer (POE): ENGAGE 8200 available from Du Pont Dow Elastomer Co.

Acid Modification of Polyolefin Elastomer

By means of a drum blender, 100 parts by weight of the polyolefin elastomer "ENGAGE 8200" was uniformly blended with 0.2 parts by weight of maleic anhydride (in granular form with sizes of not greater than 1 mm) and 0.1 part by weight of 1,3-bis(t-butylperoxyisopropyl)benzene.

The resulting mixture was melted and extruded by means of a twin-screw extruder (NRII-46mmSG available from Freesia Macros Corporation) with an L/D ratio of 40 under the following conditions.

Cylinder temperature: 200° C.
Screw rotation speed: 150 rpm
Extrusion rate: 50 kg/hr Thus, an acid modification product (M-POE) of the polyolefin elastomer was prepared.

It is noted that the twin-screw extruder has such a construction that a hopper provided on the most upstream side thereof is followed by:

(1) a 18D feeding and melting section;
(2) a 6D rotor kneading segment section;
(3) a 4D feeding section (having a downstream feeding port, which was not used in this process);
(4) a 4D kneading disk zone; and
(5) a 8D discharge section (having a vent hole at its 2D point, through which the extruder is evacuated).

Preparation of Polyamide Compositions

For preparation of polyamide compositions of Examples 1-1 to 1-4 and Comparative Examples 1-1 to 1-5, the ingredients were blended in accordance with formulations as shown in Tables 1-1 and 1-2, melt-kneaded and extruded by means of the aforesaid twin-screw extruder under the following conditions.

Cylinder temperature: 250° C.
(270° C. only for Example 1-3)
Screw rotation: 300 rpm
Throughput: 100 kg/hr.

Tests of Polyamide Compositions

For preparation of test samples, the polyamide compositions thus obtained were each molded in a multi-cavity mold kept at 70° C. by means of an injection molding machine (J75EII available from The Japan Steel Works, Ltd.(Nippon Seiko Co., Ltd.)) at a cylinder temperature of 250° C. (270° C. only in Example 1-3). For each of Examples 1-1 to 1-4 and Comparative Examples 1-1 to 1-5, products molded at one shot were used as the test samples for the tensile strength test, the flexural strength (flexural modulus) test and the Izod impact test. These test samples were kept in an absolutely dry state at room temperature for 48 hours before the tests. It is noted that the test samples for the Izod impact test were notched by machining. The tensile strength test and the flexural strength test were performed in accordance with ASTM D638 and ASTM D790, respectively. The Izod impact test was performed in accordance with the prescribed testing method.

The results of the tests are shown along with the formulations of the polyamide compositions in Tables 1-1 and 1-2.

TABLE 1-1

|  | Unit | Com. Ex 1-1 | Com. Ex 1-2 | Com. Ex 1-3 | Ex. 1-1 | Ex. 1-2 |
|---|---|---|---|---|---|---|
| Formulation |  |  |  |  |  |  |
| PA 6 | Parts by weight | 100 |  | PA 6 | 80 | 80 | 70 |
| POE | Parts by weight |  | + | 20 |  |  |
| M-POE | Parts by weight |  | MEPG | 20 | 30 |  |

TABLE 1-1-continued

|  | Unit | Com. Ex 1-1 | Com. Ex 1-2 | Com. Ex 1-3 | Ex. 1-1 | Ex. 1-2 |
|---|---|---|---|---|---|---|
| Properties |  |  |  |  |  |  |
| Tensile strength | kgf/mm$^2$ | 7.5 | 4.8 | 5.0 | 4.8 | 3.4 |
| Flexural strength | kgf/mm$^2$ | 11.7 | 6.7 | 8.5 | 7.7 | 5.3 |
| Flexural modulus | kgf/mm$^2$ | 277 | 170 | 218 | 182 | 141 |
| Izod impact strength | kgf · cm/cm | 2.4 | 70 | 5.0 | 86 | 96 |

TABLE 1-2

|  | Unit | Com. Ex 1-4 | Ex. 1-3 | Com. Ex 1-5 | Ex. 1-4 |
|---|---|---|---|---|---|
| Formulation |  |  |  |  |  |
| PA 6 | Parts by weight |  |  |  |  |
| POE | Parts by weight | 100 | 80 |  |  |
| PA MxD6 | parts by weight |  |  | 100 | 80 |
| M-POE | Parts by weight |  | 20 |  | 20 |
| Properties |  |  |  |  |  |
| Tensile strength | kgf/mm$^2$ | 8.4 | 5.2 | 8.4 | 6.1 |
| Flexural strength | kgf/mm$^2$ | 10.5 | 8.0 | 16.0 | 10.1 |
| Flexural modulus | kgf/mm$^2$ | 288 | 204 | 460 | 280 |
| Izod impact strength | kgf · cm/cm | 5.4 | 78 | 1.9 | 10.4 |

In Tables 1-1 and 1-2, the proportions of the ingredients are given in parts by weight. A polyamide composition of "PA 6+MEPG" in Comparative Example 1-2 is a super tough (very high impact resistant) polyamide 6 which contains nylon 6 and a modified ethylene-propylene rubber and is commercially available from Mitsubishi Engineering Plastics Co., Ltd. under the trade name "NOVAMIDE ST-120".

In Tables 1-1 and 1-2, the tensile strength, the flexural strength and the flexural modulus are expressed in kgf/mm$^2$, and the Izod impact strength is expressed in kgf.cm/cm. It is noted that these mechanical properties were determined with the test samples being kept in the absolutely dry state.

As can be understood from Table 1-1, the Izod impact strength of the polyamide composition (PA 6:M-POE= 80:20) of Example 1-1 was 90 kgf.cm/cm which is much higher than those in Comparative Example 1-1 (PA 6 alone), Comparative Example 1-2 (PA 6+MEPG) and Comparative Example 1-3 (PA 6:unmodified POE=80:20). However, the flexural strength and flexural modulus in Example 1-1 were a little lower than those in Comparative Example 1-1 (PA 6 alone). The polyamide composition of Example 1-2 was superior in the impact resistance, tensile strength and flexural modulus to the prior art polyamide composition of Comparative Example 1-2. The polyamide composition of Comparative Example 1-3 which contained 20 parts by weight of the unmodified POE unlike Examples 1-1 and 1-2 exhibited a much lower tensile strength, flexural strength and flexural modulus than the polyamide of Comparative Example 1-1, though the Izod impact strength thereof was only about twice as high as that of Comparative Example 1-1. This indicates that the addition of the acid-modified metallocene catalyzed polyolefin elastomer significantly improves the Izod impact strength.

The Izod impact strength of the polyamide composition of Example 1-2 which contained 30 parts by weight of the acid-modified metallocene catalyzed polyolefin elastomer (M-POE) was increased by greater than 10%, but the tensile strength and flexural strength thereof were reduced by about 20% to 30% in comparison with the polyamide composition of Example 1-1 which contained 20 parts by weight of the M-POE. This indicates that the addition of greater than about 30 wt % of the M-POE is not effective.

As shown in Table 1-2, the polyamide compositions of Example 1-3 and Comparative Examples 1-4 contained the nylon 66 (PA 66) as a base polymer, and the polyamide compositions of Example 1-4 and Comparative Example 1-5 contained the nylon MXD6 (PA MXD6) as a base polymer.

A comparison between Example 1-3 and Comparative Example 1-4 shows the effect of the addition of the M-POE to the PA 66. The addition of 20wt % of the M-POE to the PA 66 increased the Izod impact strength of the polyamide composition by more than 10 times without impairing the other mechanical properties.

A comparison between Example 1-4 and Comparative Example 1-5 shows the effect of the addition of the M-POE to the PA MXD6. The addition of 20 parts by weight of the M-POE to the PA MXD6 (which intrinsically has a low impact resistance) increased the Izod impact strength of the polyamide composition by more than 5 times. Thus, the drawback to the nylon MXD6 was alleviated.

Second Inventive Mode

EXAMPLES 2-1 TO 2-4 AND COMPARATIVE EXAMPLES 2-1 to 2-11

Examples 2-1 to 2-4 and Comparative Examples 2-1 to 2-11 of the second inventive mode will hereinafter be described. The following ingredients were used in Examples 2-1 to 2-4 and Comparative Examples 2-1 to 2-11.

Ingredients

1. Polyamide

Nylon 6 (PA 6): NYLON6 T310B available from Teijin Ltd.

2. Novolak prepolymer

Novolak phenol (PH): Novolak prepolymer having a melting point of 110° C.

3. Metallocene catalyzed polyolefin elastomer

Polyolefin elastomer (POE): ENGAGE 8200 available from Du Pont Dow Elastomer Co.

4. Other impact modifiers

Epoxidized SBS elastomer (E-SBS): EPOFRIEND 1010 available from Daicel Chemical Industries Ltd.

Ethylene-acrylic acid-maleic anhydride terpolymer (AAE): BONDINE AX8390 available from Sumitomo Chemical Industries Co., Ltd.

Modified syndiotactic polypropylene (M-SPP): Maleic anhydride modification product of syndiotactic polypropylene obtained by olefin polymerization using metallocene catalyst These compounds were used in Comparative Examples, because each have a functional group and generally recognized to improve the impact resistance (strength) of polyamide.

Acid Modification of POE

By means of a drum blender, 100 parts by weight of the polyolefin elastomer "ENGAGE 8200" was uniformly blended with 0.2 parts by weight of maleic anhydride (in granular form with sizes of not greater than 1 mm) and 0.1 part by weight of 1,3-bis(t-butylperoxyisopropyl)benzene.

The resulting mixture was melt-kneaded by a twin-screw extruder (NRII-46mmSG available from Freesia Macros Corp.) having an L/D ratio of 40 under the following conditions.

Cylinder temperature: 200° C.
Screw rotation: 150 rpm
Throughput: 50 kg/hr

Thus, an acid modification product (M-POE) of the polyolefin elastomer was prepared.

It is noted that the twin-screw extruder has such a construction that a hopper provided on the most upstream side thereof is followed by:

(1) a 18D feeding and melting zone;
(2) a 6D rotor segment zone;
(3) a 4D transportation zone (having a downstream feeding port, which was not used in this process);
(4) a 4D kneading disk zone; and
(5) a 8D discharge zone (having a vent hole at its 2D point, through which the extruder is evacuated).

Preparation of Polyamide Compositions

For preparation of polyamide compositions of Examples 2-1 to 2-4 and Comparative Examples 2-1 to 2-11, the ingredients were uniformly blended in accordance with formulations as shown in Tables 2-1 to 2-4, melt-kneaded and extruded by means of the aforesaid twin-screw extruder under the following conditions.

Cylinder temperature: 240° C.
Screw rotation: 300 rpm
Throughput: 100 kg/hr

Tests of Polyamide Compositions

For preparation of test samples, the polyamide compositions were each molded in a multi-cavity mold kept at 70° C. by means of an injection molding machine (J75EII available from The Japan Steel Works, Ltd.) at a cylinder temperature of 250° C. (270° C. only in Example 2-3). For each of Examples 2-1 to 2-4 and Comparative Examples 2-1 to 2-11, products molded at one shot were used as the test samples for the tensile strength test, the flexural strength (flexural modulus) test and the Izod impact test. Before the tests, half of these test samples were kept in an absolutely dry state at room temperature for 48 hours, and the other half of the test samples were kept in a moisture conditioned state under equilibrium conditions at 23° C., 50% RH in conformity with ISO 1110. It is noted that the test samples for the Izod test were notched by machining. The tensile strength test and the flexural strength test were performed in accordance with ASTM D638 and ASTM D790, respectively. The Izod impact test was performed in accordance with the prescribed testing method.

The results of the tests are shown along with the formulations of the polyamide compositions in Tables 2-1 to 2-4.

TABLE 2-1

| Formulation | Unit | Com. Ex. 2-1 | | Com. Ex. 2-2 | | Com. Ex. 2-3 | | Com. Ex. 2-4 | |
| --- | --- | --- | --- | --- | --- | --- | --- | --- | --- |
| PA 6 | Parts by weight | 100 | | 90 | | 85 | | 70 | |
| PH | Parts by weight | | | 10 | | 15 | | 30 | |
| Properties | Unit | A | B | A | B | A | B | A | B |
| Tensile strength | kgf/mm$^2$ | 7.5 | 4.7 | 7.1 | 5.9 | 6.6 | 6.8 | 6.4 | 6.2 |
| Flexural strength | kgf/mm$^2$ | 11.7 | 4.7 | 15.2 | 9.1 | 15.0 | 11.4 | 13.6 | 12.6 |
| Flexural modulus | kgf/mm$^2$ | 277 | 112 | 355 | 232 | 374 | 323 | 376 | 437 |
| Izod impact strength | kgf · cm/cm | 2.4 | 4.4 | 2.3 | 1.5 | 2.5 | 1.6 | 1.1 | 1.2 |

A: In absolutely dry state
B: In moisture conditioned state

TABLE 2-2

| Formulation | Unit | Ex. 2-1 | Ex. 2-2 | Ex. 2-3 | Ex. 2-4 |
| --- | --- | --- | --- | --- | --- |
| PA 6 | Parts by weight | 76.5 | 68 | 59.5 | 72 |
| PH | Parts by weight | 13.5 | 12 | 10.5 | 8 |
| M-POE | Parts by weight | 10 | 20 | 30 | 20 |

TABLE 2-2-continued

| Formulation | Unit | Ex. 2-1 | | Ex. 2-2 | | Ex. 2-3 | | Ex. 2-4 | |
|---|---|---|---|---|---|---|---|---|---|
| Properties | Unit | A | B | A | B | A | B | A | B |
| Tensile strength | kgf/mm$^2$ | 6.3 | 6.3 | 5.1 | 4.6 | 4.1 | 2.9 | 5.3 | 3.9 |
| Flexural strength | kgf/mm$^2$ | 9.4 | 10.3 | 7.6 | 8.3 | 6.2 | 3.5 | 8.5 | 5.4 |
| Flexural modulus | kgf/mm$^2$ | 247 | 270 | 212 | 232 | 165 | 150 | 219 | 155 |
| Izod impact strength | kgf · cm/cm | 8.5 | 9.9 | 40.3 | 44.2 | 81.8 | 95.5 | 45.0 | 62.7 |

A: In absolutely dry state
B: In moisture conditioned state

TABLE 2-3

| Formulation | Unit | Com. Ex. 2-5 | | Com. Ex. 2-6 | | Com. Ex. 2-7 | |
|---|---|---|---|---|---|---|---|
| PA 6 | Parts by weight | 68 | | 76.5 | | 68 | |
| PH | Parts by weight | 12 | | 13.5 | | 12 | |
| POE | Parts by weight | 20 | | | | | |
| E-SBS | Parts by weight | | | 10 | | 20 | |
| Properties | Unit | A | B | A | B | A | B |
| Tensile strength | kgf/mm$^2$ | 5.8 | 4.0 | 8.8 | 6.1 | 5.5 | 4.6 |
| Flexural strength | kgf/mm$^2$ | 9.0 | 4.8 | 10.1 | 10.7 | 7.8 | 8.2 |
| Flexural modulus | kgf/mm$^2$ | 246 | 137 | 266 | 293 | 207 | 239 |
| Izod impact strength | kgf · cm/cm | 3.3 | 3.7 | 4.1 | 4.7 | 5.3 | 6.2 |

A: In absolutely dry state
b: In moisture conditioned state

TABLE 2-4

| Formulation | Unit | Com. Ex. 2-8 | | Com. Ex. 2-9 | | Com. Ex. 2-10 | | Com. Ex. 2-11 | |
|---|---|---|---|---|---|---|---|---|---|
| PA 6 | Parts by weight | 76.5 | | 68 | | 76.5 | | 68 | |
| PH | Parts by weight | 13.5 | | 12 | | 13.5 | | 12 | |
| M-SPP | Parts by weight | 10 | | 20 | | | | | |
| AAE | Parts by weight | | | | | 10 | | 20 | |
| Properties | Unit | A | B | A | B | A | B | A | B |
| Tensile strength | kgf/mm$^2$ | 6.7 | 6.6 | 6.0 | 5.7 | 6.4 | 6.2 | 5.2 | 4.8 |
| Flexural strength | kgf/mm$^2$ | 10.6 | 12.5 | 9.2 | 10.7 | 9.9 | 8.8 | 7.6 | 6.8 |
| Flexural modulus | kgf/mm$^2$ | 266 | 313 | 246 | 285 | 259 | 260 | 200 | 203 |
| Izod impact strength | kgf · cm/cm | 3.4 | 3.2 | 3.5 | 3.5 | 7.9 | 9.1 | 13.0 | 13.9 |

A: In absolutely dry state
B: In Moisture conditioned state

As shown in Table 2-2, the polyamide compositions of Examples 2-1 to 2-4 respectively contained the modified polyolefin elastomer (M-POE) in proportions of 10 wt %, 20 wt %, 30 wt % and 20 wt %. Further, the polyamide compositions of Examples 2-1 to 2-3 contained the nylon 6 (PA 6) and the novolakprepolymer (PH) in a weight ratio of 85:15, and the polyamide composition of Example 2-4 contained the PA 6 and the PH in a weight ratio of 90:10.

The polyamide compositions of Examples 2-1 to 2-4 each exhibited a much higher Izod impact strength than the polyamide compositions of Comparative Examples 2-1 to 2-4 shown in Table 2-1, and the other mechanical properties thereof were comparable to those of Comparative Examples 2-1 to 2-4.

The polyamide composition of Comparative Example 2-5 shown in Table 2-3 contained the nylon 6 (PA 6) and the novolak prepolymer (PH) in a weight ratio of 85:15 (like the polyamide composition of Comparative Example 2-3) and the unmodified polyolefin elastomer (POE) in a proportion of 25 wt % based on the total weight of the PA 6 and the PH (or 20 wt % based on the weight of the total polyamide composition). The polyamide composition of Comparative Example 2-5 was generally inferior in the mechanical properties to the polyamide composition of Comparative Example 2-3 and even to the pure PA 6 of Comparative Example 2-1. This indicates that the addition of the unmodified POE is not effective.

The polyamide compositions of Comparative Examples 2-6 and 2-7 shown in Table 2-3 each contained the nylon 6 (PA 6) and the novolak prepolymer (PH) in a weight ratio of 85:15 (like the polyamide composition of Comparative Example 2-5), and respectively further contained the epoxidized SBS elastomer (E-SBS) in proportions of 10 wt % and 20 wt % based on the weights of the polyamide compositions. The polyamide compositions of Comparative Examples 2-6 and 2-7 each had a lower Izod impact strength than the polyamide compositions of Examples 2-1 to 2-4, though the other mechanical properties thereof were a little more excellent. This indicates that the addition of the E-SBS is not effective.

The polyamide compositions of Comparative Examples 2-8 and 2-9 shown in Table 2-4 each contained the nylon 6 (PA 6) and the novolak prepolymer (PH) in a weight ratio of 85:15 (like the polyamide composition of Comparative Example 2-3 shown in Table 2-1), and respectively contained the modified syndiotactic polypropylene (M-SPP) in proportions of 10 wt % and 20 wt % based on the weights of the polyamide compositions. The properties of the polyamide compositions of Comparative Examples 2-8 and 2-9 were not improved over the polyamide composition of Comparative Example 2-3. This indicates that the addition of the M-SPP is not effective.

The polyamide compositions of Comparative Examples 2-10 and 2-11 shown in Table 2-4 each contained the nylon 6 (PA 6) and the novolak prepolymer (PH) in a weight ratio of 85:15 (like the polyamide composition of Comparative Example 2-3 shown in Table 2-1), and respectively contained the ethylene-acrylic acid-maleic anhydride terpolymer (AAE) in proportions of 10 wt % and 20 wt % based on the weights of the polyamide compositions. The polyamide compositions of Comparative Examples 2-10 and 2-11 each had a higher Izod impact strength than the polyamide composition of Comparative Example 2-3, but the improvement in the Izod impact strength over Examples 2-2 to 2-4 was very small. In Comparative Example 11, the addition of 20 wt % AAE for improvement of the Izod impact strength remarkably reduced the flexural modulus of the polyamide composition, which is not suitable as a material for structural components with an improper property balance.

As can be understood from the foregoing, the Izod impact strength of a polyamide composition containing 90 to 85 parts by weight of the nylon 6 and correspondingly 10 to 15 parts by weight of the novolak prepolymer can remarkably be improved by adding thereto the acid modification product of the polyolefin elastomer obtained by olefin polymerization using a metallocene catalyst in a proportion of 10 to 30 wt % of the total polyamide composition. Thus, the effect of the present invention has been proved.

While the present invention has thus been described in detail by way of the examples according to the two inventive modes, it should be understood that the invention is not limited to these examples. For example, any of various additives such as pigments, dyes, heat stabilizers, antioxidants, UV stabilizers, lubricants, nucleating agents, antistatic agents (antistats) and plasticizers, and other polymers may be added to the polyamide composition, as long as the additives and the like do not impair the properties of the polyamide composition. Further, aliphatic crystalline polyamides other than nylon 6 may be used as the polyamide in the present invention. Still further, the metallocene catalyzed polyolefin elastomer may have side chains each having carbon atoms of a number smaller or greater than 6.

What is claimed is:

1. A polyamide composition comprising:
   90 to 70 parts by weight of a polyamide; and
   corresponding 10 to 30 parts by weight of an acid-modified product of a polyolefin elastomer, the polyolefin elastomer having a density of approximately 0.87 g/cc and being polymerized using a geometrically constrained metallocene catalyst, the acid-modified product wherein the polyolefin elastomer is acid-modified such that a polar functional group is added to the polyolefin elastomer;
   the polyamide composition having a flexural modulus of 141 kgf/mm$^2$ or higher and a tensile strength of 3.4 kgf/mm$^2$ or higher.

2. A polyamide composition as set forth in claim 1, wherein the polyamide is an aliphatic crystalline polyamide or a crystalline polyamide having an aromatic group in the molecule thereof.

3. A polyamide composition as set forth in claim 2, wherein the aliphatic crystalline polyamide is selected from the group consisting of nylon 6, nylon 66 and nylon 46.

4. A polyamide composition as set forth in claim 3, wherein the polyolefin elastomer is an ethylene/α-olefin copolymer with a comonomer ratio of α-olefin to ethylene being 5 wt % to 30 wt %.

5. A polyamide composition as set forth in claim 4, wherein the polyolefin elastomer has a repeating unit of $[CH_2-CH_2]_n\cdot[CH_2-CH.R]_m$, wherein m is a positive integer, n is a positive integer, and R is a side chain of $CH_3\cdot[CH_2]_L$ (wherein L is an integer not smaller than 3 and not greater than 8).

6. A polyamide composition as set forth in claim 5, wherein the acid-modified product of the polyolefin elastomer is a product obtained by acid-modifying the polyolefin elastomer with 0.01 wt % to 1.0 wt % of maleic acid or maleic anhydride.

7. A polyamide composition as set forth in claim 3, wherein the acid-modified product of the polyolefin elastomer is a product obtained by acid-modifying the polyolefin elastomer with 0.01 wt % to 1.0 wt % of maleic acid or maleic anhydride.

8. A polyamide composition as set forth in claim 2, wherein the acid-modified product of the polyolefin elastomer is a product obtained by acid-modifying the polyolefin elastomer with 0.01 wt % to 1.0 wt % of maleic acid or maleic anhydride.

9. A polyamide composition as set forth in claim 1, wherein the acid-modified product of the polyolefin elastomer is a product obtained by acid-modifying the polyolefin elastomer with 0.01 Wt% to 1.0 wt % of maleic acid or maleic anhydride.

10. A polyamide composition comprising:
    100 parts by weight of a polyamide resin;
    10 to 50 parts by weight of a novolak phenol prepolymer, and
    10 to 100 parts by weight of an acid-modified product of a polyolefin elastomer, the polyolefin elastomer having a density of approximately 0.87 g/cc and being polymerized using a geometrically constrained metallocene catalyst the acid-modified product wherein the polyolefin elastomer is acid-modified such that a polar functional group is added to the polyolefin elastomer.

11. A polyamide composition as set forth in claim 10, wherein the polyamide resin is an aliphatic crystalline polyamide resin.

12. A polyamide composition as set forth in claim 11, wherein the aliphatic crystalline polyamide resin is nylon 6.

13. A polyamide composition as set forth in claim 12, wherein polyolefin elastomer is an ethylene/α-olefin copolymer with a comonomer ratio of α-olefin to ethylene being 5 wt % to 30 wt %.

14. A polyamide composition as set forth in claim 13, wherein polyolefin elastomer has a repeating unit of $[CH_2-CH_2]_n \cdot [CH_2-CH.R]_m$, wherein m is a positive integer, n is a positive integer, and R is a side chain of $CH_3 \cdot [CH_2]_L$ (wherein L is an integer not smaller than 3 and not greater than 8).

15. A polyamide composition as set forth in claim 14, wherein the acid-modified product of the polyolefin elastomer is a product obtained by acid-modifying the polyolefin elastomer with 0.01 wt % to 1.0 wt % of maleic acid or maleic anhydride.

16. A polyamide composition as set forth in claim 12, wherein the acid-modified product of the polyolefin elastomer is a product obtained by acid-modifying the polyolefin elastomer with 0.01 wt % to 1.0 wt % of maleic acid or maleic anhydride.

17. A polyamide composition as set forth in claim 11, wherein the acid-modified product of the polyolefin elastomer is a product obtained by acid-modifying the polyolefin elastomer with 0.01 wt % to 1.0 wt % of maleic acid or maleic anhydride.

18. A polyamide composition as set forth in claim 10, wherein the acid-modified product of the polyolefin elastomer is a product obtained by acid-modifying the polyolefin elastomer with 0.01 wt % to 1.0 wt % of maleic acid or maleic anhydride.

* * * * *